April 28, 1936.  R. CLADE  2,038,889
LUBRICATED VALVE
Filed Oct. 5, 1933  2 Sheets-Sheet 1
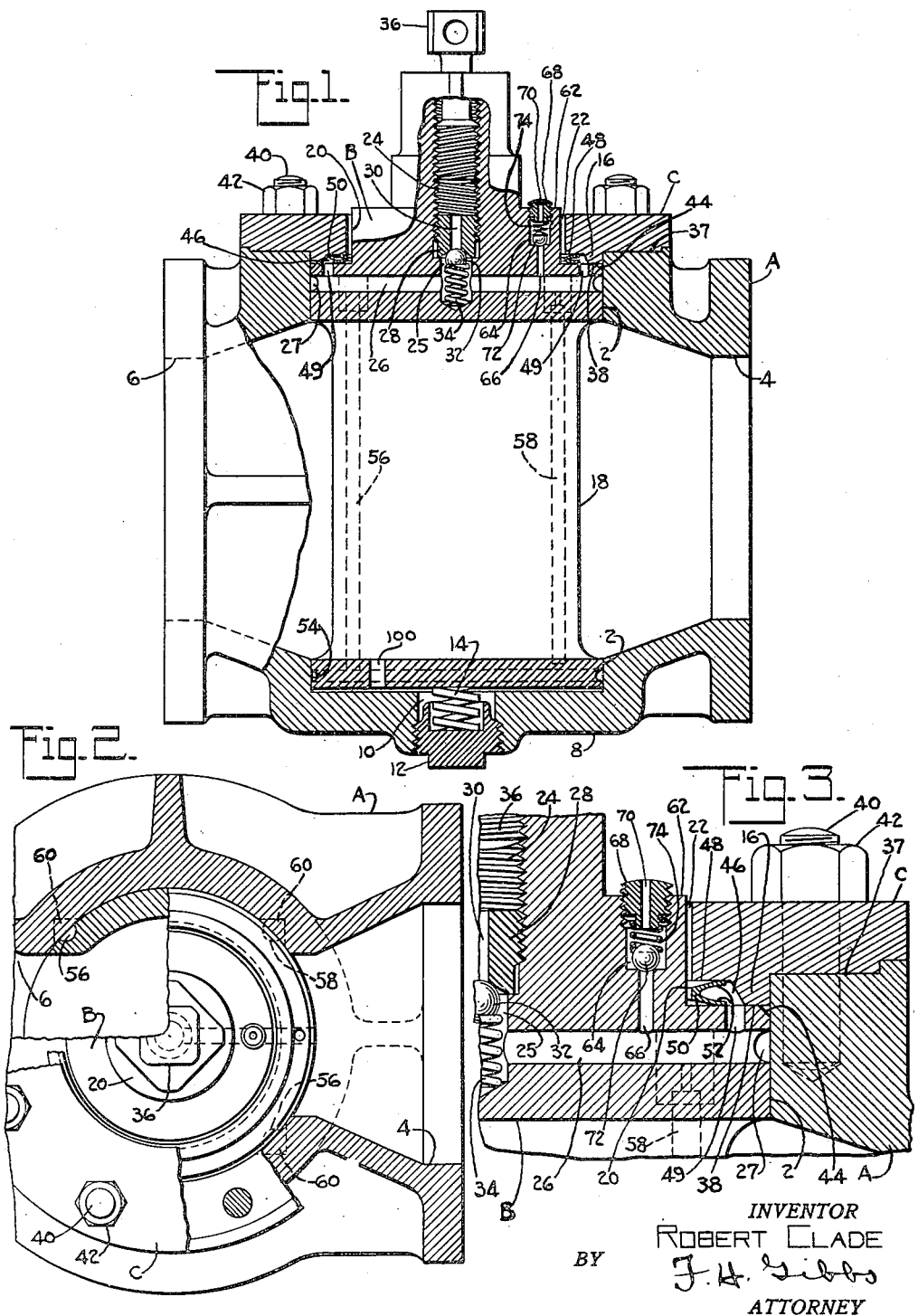
INVENTOR
ROBERT CLADE
BY F. H. Gibbs
ATTORNEY

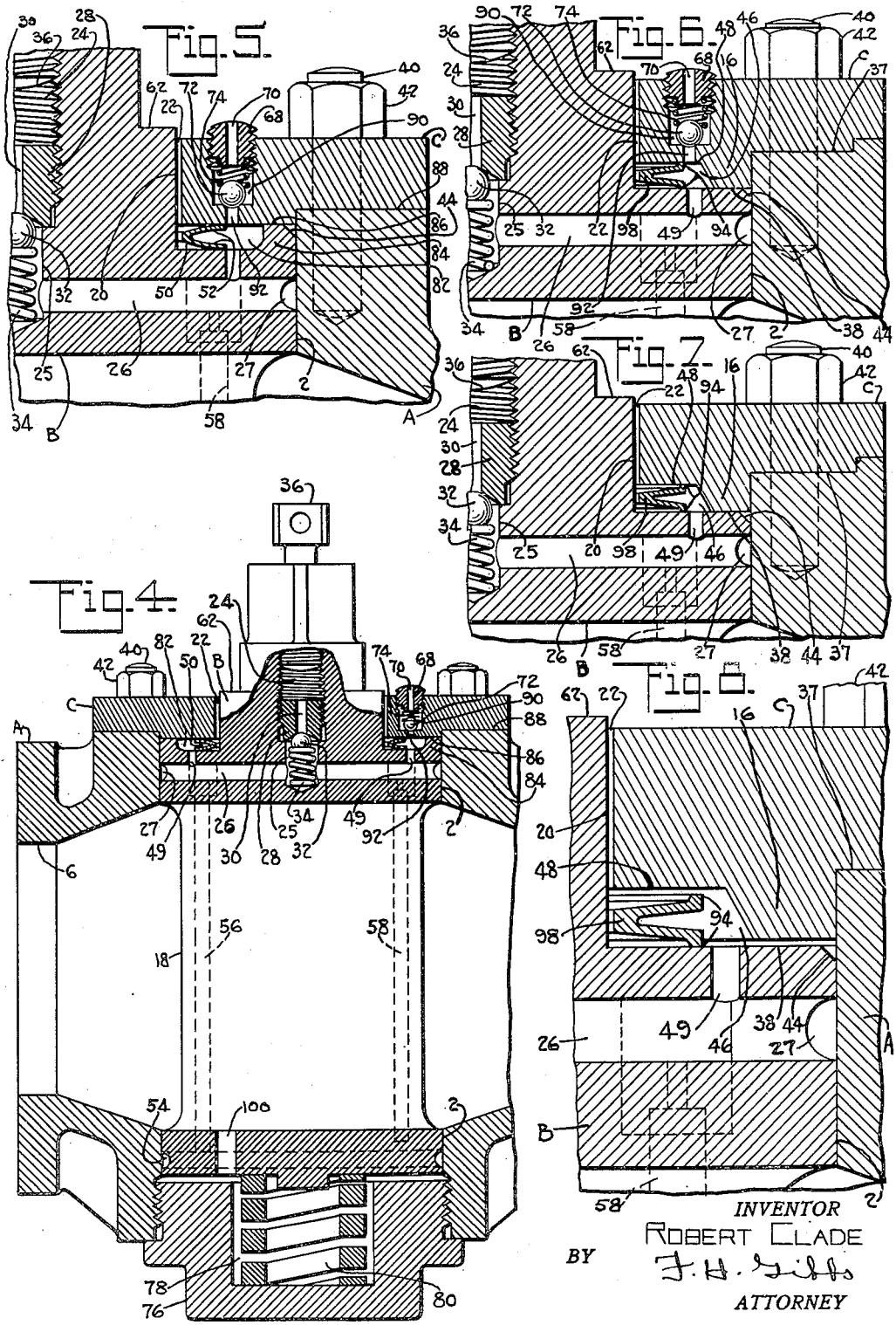

Patented Apr. 28, 1936

2,038,889

UNITED STATES PATENT OFFICE 2,038,889

LUBRICATED VALVE

Robert Clade, Detroit, Mich., assignor to American Car and Foundry Company, New York, N. Y., a corporation of New Jersey Application October 5, 1933, Serial No. 692,297

9 Claims. (Cl. 251—93)

This invention relates generally to valves of the type in which lubricant is forced under pressure between cooperating surfaces of a valve body and a valve plug, the valves being known in the art as lubricated valves.

One object of this invention is the provision of a lubricated valve in which lubricant under pressure is forced directly to a lubricant chamber defined between overlapping portions of a valve plug and a valve body, at the head portion of the valve.

Another object of this invention is the provision of a valve having means for lubricating the contacting surfaces of the valve plug and valve body, said valve plug and valve body being relatively so arranged that when the valve has been sufficiently lubricated a visual signal is provided for advising an operator to this effect.

Still another object of this invention is the provision of a lubricated valve in which the plug therefor is inserted into the body through the upper end portion of the latter and normally sealed against leakage of lubricant by the cooperation of a removable head portion for the valve and a sealing element interposed between said removable element and the upper end portion of the plug.

A further object of this invention is the provision of a lubricated valve embodying a body and a plug rotatable therein, a gland or other suitable member being secured to the body at the head portion and so formed as to provide a lubricant chamber between the upper end portion of the plug and the gland, the lubricant received in said chamber being prevented from leaking out of the valve body by means of a metallic sealing element interposed between the gland and the plug and forming one wall of the lubricant chamber.

Other objects and advantages of this invention will be apparent from the following description taken in conjunction with the accompanying drawings, in which Figure 1 is a sectional view through a valve showing one form of the invention.

Fig. 2 is a view, partly in section and partly in top plan, of the valve shown in Fig. 1.

Fig. 3 is an enlarged detail sectional view of a part of the head portion of the valve shown in Fig. 1.

Fig. 4 is a sectional view through a valve showing a modified form of the invention.

Fig. 5 is an enlarged sectional view showing certain details of construction at the head portion of the valve shown in Fig. 4.

Fig. 6 is a view similar to Fig. 5 but showing a modified form of sealing element.

Fig. 7 is a view similar to Fig. 5 and showing the sealing element shown in Fig. 6 but constituting a modification in that the relief valve of Fig. 6 is omitted; and Fig. 8 is an enlarged detail sectional view of the construction shown in Fig. 7, the view showing the plug shifted axially downward relative to the gland to provide a clearance between the gland and sealing element.

Referring now more particularly to the drawings in which similar characters of reference designate similar parts in the several views, the valve of the present invention comprises in the main a body A, a plug B, and a removable gland at the upper end portion of the body indicated at C. In Figs. 1 to 3, inclusive, the body is provided with a central longitudinal bore forming an integral plug seat 2. The valve shown is of the two-way type but this is merely by way of example, said valve being provided with port openings 4 and 6 which, for convenience, are designated as ingress and egress ports. As clearly shown in Fig. 1, the lower end of the body A is provided with a base plate 8 formed integral with the body and provided with an opening 10 which extends into the longitudinal bore and is internally threaded to secure a closure element 12 constituting a seat for a spring 14 which bears against the lower end of the plug B and normally urges the plug longitudinally in the body so that its upper end portion is retained in contact with the gland C. In Figs. 1 and 3, the contacting of the upper end of the plug and the gland is formed at the seating surface of a shoulder 16 which depends from and in the instance shown is formed integrally with the gland C.

The plug B is provided with a body portion 18 having an opening therethrough adapted to be alined with the port openings 4 and 6 to place the valve in open position. The upper end portion of the valve is provided with an integrally formed stem 20 which extends through an opening formed in the gland C and as clearly shown in Figs. 1 and 3, the stem is of such a diameter as to provide a clearance space 22 between gland C and the stem whereby, under certain conditions, lubricant may leak from the valve body as hereinafter more fully described.

The stem 20 is hollow whereby to constitute a lubricant reservoir 24 which communicates through a port 25 with a lubricant duct 26 extending transversely through the upper end portion of the plug into communication with a circumferential lubricant groove 27 formed in the plug adjacent its upper end. Secured in the lubricant reservoir 24 adjacent its lower end is a valve seat 28 having a port 30 which is normally closed by a ball valve 32 retained in position by a spring 34 arranged in the upper portion of the plug, the ball valve obviously serving to control passage of lubricant from the reservoir 24 to the duct 26. For forcing lubricant from the reservoir into the duct 26 a ram 36 is threadedly engaged in the reservoir.

The upper end of the plug is machined whereby to provide a seating surface 38 with which the seating surface of the shoulder closely contacts in sealing relation, the seating surface of the shoulder also being machined. The upper end of the body is provided with a seat 37 arranged, in the instance shown, in a plane above the seating surface of the shoulder 16 and the area of contact between said shoulder and the upper end of the plug. Obviously, if desired, the valve may be so constructed that the seat 37 is in a plane below the contacting surfaces of the shoulder 16 and the upper end of the plug. In either event, the seating surface 37 serves to support the gland C which is secured in position by suitable fasteners such as the bolts 40 and their nuts 42.

As more clearly shown in Fig. 3, the shoulder 16 depends from the gland C in such a position as to be arranged immediately adjacent and in contact with the body A. For convenience the upper marginal edge of the plug is beveled as at 44.

Due to the provision of the shoulder 16 a chamber is provided between overlapping portions of the gland C and the plug B, said chamber being indicated at 46 and having an upper wall 48 which, in the instance shown, is arranged in a plane slightly below the seat 37 on body A. Connecting the lubricant chamber 46 with the transverse duct 26 are oppositely arranged ports 49 through which lubricant under pressure from the duct 26 may pass into the chamber 46.

Supported on the upper end of the plug B and surrounding the stem 20 is a lubricant sealing element 50. In the form of the invention shown in Figs. 1 and 3, this lubricant sealing element comprises a unitary metal element of substantially ring-like form, said element being generally V-shaped in section with the arms 52 thereof normally in metal to metal contact with the upper end of the plug and the wall 48 of the lubricant chamber, respectively. This sealing element 50 constitutes one wall of the lubricant chamber 46 and completely surrounds the stem of the plug. Being of metal this element 50 possesses inherent resiliency to a certain degree and therefore under normal operating conditions of the valve the arms 52 will seal the lubricant chamber against leakage of lubricant therefrom, it being understood that under certain service conditions and line pressure passing through the valve the plug B tends to pulsate within the body. The inherent resiliency of this sealing element 50 permits expansion thereof during pulsations or normal axial shifting of the plug in the body.

Formed in the lower end portion of the plug is a lubricant arresting groove 54 with which longitudinal lubricant grooves 56 formed in the plug communicate and at which they terminate. The design of valve shown in Fig. 1 also provides longitudinal lubricant grooves 58, the lower end portions of which terminate above the arresting groove 54. This is illustrative only as, within the spirit of this invention, these grooves 58 may extend to and communicate with the arresting groove 54. In practice usually four longitudinal lubricant grooves are formed in the plug. These lubricant grooves 56 and 58 communicate at their upper ends with the circumferential groove 27 and receive lubricant therefrom whereby lubricant may be introduced into the valve between the contacting surfaces of the plug seat and the body of the plug. The drawings disclose dwarf grooves 60 formed in the body with which the longitudinal plug grooves communicate during certain positions of the plug in the body to provide for free passage of lubricant from the circumferential groove 27 to said plug grooves 56 and 58.

As lubricant is forced from the reservoir 24 to the duct 26 and lubricant chamber 46 and also from the circumferential groove 27 to the longitudinal grooves in the plug in order to lubricate the valve it will be obvious that a pressure will be developed in the lubricant chamber 46. This pressure, due to the particular conformation of the sealing element 50, tends to force the arms 52 more closely into contact with the plug and the gland and thus eliminate any tendency of leakage of lubricant through the space 22. The spring 14 is constantly urging the upper end of the plug in engagement with the shoulder 16 and this upward pressure is increased by line pressure from the ingress port 4 which is permitted to pass beneath the valve and act against the bottom thereof when the valve is in closed position, particularly in view of the fact that, with the valve in closed position, the plug shifts radially in the body under the influence of line pressure thus the plug becomes substantially eccentrically arranged within the body and a clearance is present between body and plug at the ingress port which is greatest adjacent the port and progressively reduced circumferentially of the plug toward the egress port. Unless some means is provided for venting lubricant from the valve it will be apparent that a bursting pressure may be developed by the lubricant within the valve body.

In view of this condition the present invention includes a safety device which comprises means for venting excess lubricant from the valve subsequent to satisfactory lubrication thereof. As clearly shown in Figs. 1 and 3 the stem 20 is reduced in diameter and the enlarged portion 62 thereof is arranged in the opening formed in the gland C. Formed in the enlarged portion 62 is a recess 64 which communicates with a leak port 66 extending to and communicating with the transverse lubricant duct 26. Secured in the recess 64 is a relief valve mechanism comprising a spring seat member or fitting 68 having a port 70 therethrough. Normally closing the leak port 66 is a ball valve 72 which is retained in seated position against the port 66 by means of a spring 74. From this description it can be seen that when a pressure has been developed in the lubricant chamber 46 sufficient to overcome the action of the spring 74, lubricant will be vented from the valve past the ball 72 which will be unseated by the pressure of lubricant. This leakage of lubricant through port 66 and through the fitting 68 furnishes a visual signal to indicate that the valve is sufficiently and properly lubricated.

It will be apparent that the relative actions of the springs 14 and 74 may be predetermined to effect operation of the relief valve in response to predetermined pressures within the valve.

While it is believed the relief valve safety feature will operate under substantially all desired conditions the valve of the present invention provides for an escape of excess lubricant in the event of failure or sticking of the relief valve and it can be seen that, should the pressure within the lubricant chamber attain a degree in excess of that required for operating the relief valve and, should the relief valve be inoperative for some particular or unexpected reason, the plug B will shift axially in the body against the action of spring 14 and the line pressure against the lower end of the plug to an amount in excess of the resiliency of the lubricant sealing element 50 which will permit escape of lubricant from the chamber 46 past the sealing element 50 and out of the valve through the space 22 between the gland and the enlarged portion 62 of the stem. When the pressure within the lubricant chamber has dropped to a sufficient amount it is obvious that the action of spring 14 and the line pressure against the lower end of the plug will shift the plug longitudinally in the body whereby the sealing element 50 will again seal the lubricant chamber against leakage and the contacting surfaces of shoulder 16 and the upper end of the plug will again be arranged in metal to metal sealing engagement.

In the valve shown in Figs. 4 and 5 substantially the same general assembly is present as in Figs. 1 to 3, inclusive. However, in the valve shown in Figs. 4 and 5 the plug B may be inserted into the valve body either through the bottom of the body or through the upper end portion thereof. As shown clearly in Fig. 4, the lower end of the body is provided with an opening which is of at least as great a diameter as the plug seat 2 in order to permit insertion of the plug therethrough. This opening is closed by a base plate 76 having a depression 78 therein which receives the spring 80 which acts against the lower end of the plug.

The upper end of the plug B shown in Figs. 4 and 5 is provided with an annular recess 82 which surrounds the enlarged portion 62 of the stem and constitutes a lubricant chamber. Formation of the lubricant chamber 82 provides a shoulder 84 at the periphery of the plug and its upper end is provided with a machined seating surface 86. The upper end of the valve body A is provided with a seat 88 arranged in a plane above the seating surface 86. The seating surface 86 of shoulder 84 is in metal to metal contact with the under-surface of the gland C (see Fig. 5) and said gland is provided with a recessed portion which fits on the seat 88 of the body A. The gland C is secured to the body A by the bolts 40 and their nuts 42. In the form of valve shown in Figs. 4 and 5 the relief valve is arranged in the gland C instead of in the stem 20 and, as shown more clearly in Fig. 5, the lubricant chamber 82 is connected with a recess 90 formed in the gland C by a leak port 92. Passage of lubricant through the leak port 92 is normally prevented by a relief valve of the type shown and described with reference to Figs. 1 and 2 and hence similar reference characters are employed.

The construction of valve shown in Fig. 6 is similar to that shown in Figs. 3 and 5 in that the gland C is of the same construction as that shown in Fig. 3 and hence bears the same reference characters for details of construction. The sealing element shown in Fig. 6, while generally similar to that shown in Figs. 3 and 5, is provided at the end portion of the arms 52 with oppositely directed flanges 94 which are engaged in metal to metal sealing contact with overlapping portions of the gland and the plug. Like Fig. 5, the relief valve is arranged in the gland for escape of excess lubricant from the lubricant chamber 46.

In the valve shown in Figs. 7 and 8 the construction is similar to that shown in Fig. 6 but the relief valve has been eliminated. When lubricant under pressure is inserted into the lubricant chamber 46 it is apparent that a pressure will be developed in said chamber which may be in excess of the combined action of the spring 14 (see Fig. 1) and line pressure acting against the lower end of the plug. When this pressure has been reached it is obvious that the plug B will move axially within the body and, if the pressure of lubricant be sufficient, to an amount in excess of the inherent resiliency of the sealing element 98. Such movement will result in a separation of the upper flange 94 from the wall 48 of the lubricant chamber and thus provide clearance for the escape of lubricant from the chamber 46 to the atmosphere through the space 22 between the stem 20 and gland C. When the pressure within the chamber 46 has been reduced it is obvious that the action of the spring 14, of Fig. 1, or 80, of Fig. 4, plus the line pressure acting against the bottom of the plug will return the plug to its normal position and thus seal the lubricant chamber against escape of lubricant and again place the shoulder 16 and the seating surface 38 in metal to metal contact.

Formed in the bottom of the plug, as shown clearly in Figs. 1 and 4, is a port 100 which leads from the interior of the plug to the space between the lower end of the plug and the base plate. This port 100 is provided for the purpose of permitting leakage of any lubricant which may have passed into the interior of the plug out of the plug to the space between the plug and base plate from where it may pass to the ingress port 4 of the valve to be subsequently carried away when the valve is opened. It will be understood that when the valve plug is eccentrically positioned in the body by line pressure acting against the plug when in closed position the clearance between body and plug permits lubricant to flow into the interior of the plug. When the plug is in closed position fluid is trapped therein and when the lubricant under pressure passes into this fluid, in the absence of any means for relieving excess pressure in the plug, bursting pressures may be developed. Due to the eccentric positioning of the plug in the body as the result of line pressure acting thereagainst when the valve is in closed position, should an operator attempt to or force lubricant into the valve some of the lubricant may pass from between the body and plug into the inlet line. Other lubricant will leak into the inside of the plug. When the valve is in closed position some liquid is locked inside the plug and because of the small volume of liquid in the plug as compared to the volume of liquid in the inlet line a much higher pressure will be developed inside the plug by the forcing of lubricant therein than will be developed in the inlet line. The leak port 100 permits substantial equalization of the pressure in the plug and in the inlet line and also permits leakage of lubricant out of the plug to the space therebelow and then into the inlet line whereby the development of bursting pressures within the plug is prevented.

From the above description it is believed that those skilled in the art will recognize that the valve of the present invention provides a lubricant chamber at the head portion of the valve which is so formed as to provide an annular lubricant seal between the head portion of the valve and the upper end of the valve plug which obviously prevents passage of fluid under line pressure and thus eliminates the possibility of head leaks. Over-lubrication of the valve such as might develop bursting pressures therewithin is prevented by the safety feature shown and described. It is known in the art to provide a stuffing box or other packing around the stem of the valve and between the stem and a gland. To properly function, such packing or stuffing box must have a relatively tight fit between stem and gland to prevent head leaks. When this has been done the possibility of true radial shifting of the plug in the body is prevented and, with line pressure acting against the plug in closed position, the plug becomes "cocked" in the body, thereby presenting difficulties in operation, which difficulties are enlarged proportionately as the size of the valve increases. The present invention provides what might be termed a packing introduced between overlapping portions of the plug and head portion in such a manner as not to interfere with the normal radial shifting of the plug in the body under normal service conditions, this resulting in a construction in which the valve may be easily manipulated.

Due to the fact that grease or lubricants of the type used in valves are semi-solid they do not conform to the law of the transmission of pressures of liquids and therefore when lubricant is forced into the valve body by the ram it is obvious that the pressure at the head portion of the valve will be far greater than the pressure adjacent the lower end portion of the valve. In other words, as lubricant under pressure is forced into the lubricant chambers of the several forms of valve shown and described, lubricant is also being forced into the upper circumferential groove and into the longitudinal grooves between the plug and the body, the pressure being greatest at the head portion of the valve.

In the design of a valve, it will be apparent that by utilizing springs of selected capacity for supporting the plug and for controlling the relief valve, provision is made for permitting leakage of lubricant from the valve body, more particularly from the lubricant chambers shown in Figs. 1, 3 and 4 to 8, inclusive, when a predetermined lubricant pressure has been reached within the valve.

The description above is directed to certain forms of the construction, which forms are shown in the drawings, but it is to be understood that the drawings are for illustrative purposes only and various changes in the form and proportions of the valve may be made within the scope of the appended claims without departing from the spirit of the invention.

What is claimed is:

1. In a lubricated valve, a body, a head portion for the body, a plug rotatably mounted in the body and provided with a stem extending through the head portion, spring means acting against the lower end of the plug to normally maintain the upper end of the plug in engagement with the head portion, a lubricant chamber defined between overlapping portions of the plug and head portion, means for forcing lubricant under pressure into the lubricant chamber and a metal sealing element surrounding the stem and constituting one wall of the lubricant chamber, said sealing element being interposed between the head portion and plug and arranged in engagement therewith whereby to normally prevent leakage of lubricant from the lubricant chamber.

2. In a lubricated valve, a body, a head portion for the body, a plug rotatably mounted in the body and provided with a stem extending through the head portion, spring means acting against the lower end of the plug to normally maintain the upper end of the plug in engagement with the head portion, a lubricant chamber defined between overlapping portions of the plug and head portion, means for forcing lubricant under pressure into the lubricant chamber, a packing constituting one wall of the lubricant chamber and surrounding the stem and arranged in contact with the upper end of the plug and the head portion to seal the lubricant chamber against leakage of lubricant out of the valve, and a relief valve mechanism operative in response to predetermined pressure of lubricant within the valve to vent excess lubricant from the valve.

3. In a lubricated valve, a body, a head portion for the body, a plug rotatably mounted in the body and having a stem extending through the head portion, means acting against the lower end of the plug to maintain the upper end thereof in engagement with the head portion, a lubricant chamber defined between overlapping portions of the plug and head portion, and a resilient metal sealing element surrounding the stem and mounted on the upper end of the plug, said element being interposed between overlapping portions of the plug and head portion and being arranged in metal to metal sealing engagement therewith in such a manner as to constitute one wall of the lubricant chamber.

4. In a lubricated valve, a body, a plug rotatably mounted in the body and provided with a stem, a peripheral shoulder on the plug extending completely around the upper end thereof, the upper surface thereof constituting a bearing portion, a seat in the body in a horizontal plane different from the bearing portion of the shoulder, a head portion surrounding the stem and contacting with the bearing portion and said seat in planes transverse the axis of the plug, a lubricant chamber defined between overlapping portions of said member and plug, means for normally maintaining the bearing portion in contact with said member, means for forcing lubricant under pressure into the lubricant chamber, and a packing element arranged between overlapping portions of the plug and said member and completely surrounding the stem, said packing element constituting one wall of the lubricant chamber and being arranged in sealing engagement with both said member and said plug whereby to normally prevent leakage of lubricant from the lubricant chamber.

5. In a lubricated valve, a body, a plug, rotatably mounted in the body and having a stem, a head portion for the body provided with an annular shoulder depending therefrom, spring means acting against the lower end of the plug for normally maintaining the upper end thereof in contact with said shoulder, a seat in the body in a plane above the area of contact of the shoulder and plug and on which said head portion is mounted, said shoulder defining a lubricant chamber surrounding and adjacent the stem of the plug, and a resilient sealing element immediately adjacent and surrounding the stem and contacting with overlapping portions of the head portion and plug whereby to seal the lubricant chamber against leakage of lubricant.

6. In a lubricated valve, a body, a plug rotatably mounted in the body and having a stem, a head portion for the body provided with an annular shoulder depending therefrom, spring means acting against the lower end of the plug for normally maintaining the upper end thereof in contact with said shoulder, a seat in the body in a plane above the area of contact of the shoulder and plug and on which said head portion is mounted, said shoulder defining a lubricant chamber surrounding and adjacent the stem of the plug, a resilient sealing element immediately adjacent and surrounding the stem and contacting with overlapping portions of the head portion and plug whereby to seal the lubricant chamber against leakage of lubricant, and a relief valve mechanism operative in response to predetermined pressure in the lubricant chamber for venting excess lubricant from the valve.

7. In a lubricated valve, a body, a plug rotatably mounted in the body, a head portion for the body, a lubricant chamber defined between overlapping portions of the plug and head portion, a resilient member surrounding the stem and engaging the head portion and upper end of the plug, spring means normally maintaining the resilient member in engagement with the head portion to prevent leakage of lubricant from the lubricant chamber, and means for forcing lubricant under pressure into the lubricant chamber to cause axial movement of said plug in the body against the action of said spring means to effect separation of the resilient member and head portion and permit escape of excess lubricant from the lubricant chamber.

8. In a lubricated valve, a body, a plug rotatably mounted in the body and provided with a stem, a seat formed on the upper end portion of the body, a head portion for the valve secured to the seat and overlapping the upper end of the plug in spaced relation thereto, said head portion and the upper end of the plug having portions thereof in contacting relation in a plane different from that of the seat on the body and the spaced relationship of the plug and head portion forming a lubricant chamber around the stem, a duct communicating with the lubricant chamber through which lubricant under pressure may be forced into said chamber, and a resilient sealing element mounted on the upper end of the plug and surrounding the stem with portions thereof in sealing engagement with the head portion and plug respectively, whereby to normally prevent leakage of lubricant from the lubricant chamber.

9. In a lubricated valve, a body, a plug rotatably mounted in the body and provided with a stem, a seat formed on the upper end portion of the body, a head portion for the valve secured to the seat and overlapping the upper end of the plug in spaced relation thereto, said head portion and the upper end of the plug having portions thereof in contacting relation in a plane different from that of the seat on the body and the spaced relationship of the plug and head portion forming a lubricant chamber around the stem, a duct communicating with the lubricant chamber through which lubricant under pressure may be forced into said chamber, and a resilient sealing element mounted on the upper end of the plug and surrounding the stem and provided with spaced arms engaged in sealing relation with the head portion and body respectively, whereby increase in pressure of the lubricant within the lubricant chamber tends to force said arms into closer engagement with said head portion and body to thus normally prevent leakage of lubricant from the lubricant chamber.

ROBERT CLADE.